United States Patent [19]

Nelson

[11] Patent Number: 4,798,308
[45] Date of Patent: Jan. 17, 1989

[54] WATER HEATER CONSTRUCTION AND METHOD OF MAKING SAME

[76] Inventor: Thomas E. Nelson, 11102 Ridge Rd., Anchorage, Ky. 40223

[21] Appl. No.: 82,324

[22] Filed: Aug. 6, 1987

[51] Int. Cl.$^4$ .............................................. B65D 90/04
[52] U.S. Cl. ..................................... 220/445; 220/410; 220/412; 220/448; 220/451; 220/459
[58] Field of Search ................. 220/408, 412, 413, 410, 220/445, 446, 448, 451, 459, 467

[56] References Cited

U.S. PATENT DOCUMENTS

| | | | |
|---|---|---|---|
| 3,207,358 | 9/1965 | Fuss | 220/459 |
| 3,521,604 | 7/1970 | Nickel | 220/459 |
| 3,735,895 | 5/1973 | Roper | 220/459 |
| 3,987,925 | 10/1976 | Sattelberg | 220/445 |
| 4,041,722 | 8/1977 | Terlesky et al. | 220/445 |

*Primary Examiner*—Joseph Man-Fu Moy
*Attorney, Agent, or Firm*—Woodard, Emhardt, Naughton, Moriarty & McNett

[57] ABSTRACT

A water heater construction including an inner tank for containing water surrounded in spaced apart relationship by an outer shell. An annular pocket of material is located in the annular space between the inner tank and outer sleeve. An expanded foam thermal insulation fills the pocket and, thusly, the annular space between the inner tank and outer shell. A method of making the water heater construction includes the steps of locating one end of a sleeve of flexible material over the interior wall surface of the outer shell, affixing the sleeve to the interior wall surface of the tank, locating the other end of the sleeve over the exterior wall surface of the water heater tank, affixing the sleeve to the exterior wall surface of the water heater tank, and positioning the outer shell concentrically over the inner tank whereupon a first portion of the length of the sleeve turns inside out to circumferentially overlay a portion of the length of the exterior wall surface of the inner water heater tank, a second portion of the length of the sleeve circumferentially overlays a portion of the length of the interior wall surface of the outer shell, and an intermediate portion of the length of the sleeve folds back over to form a bottom annular wall across the annular space, thereby forming a pocket in the annular space. The annular pocket is filled with an insulation material.

14 Claims, 2 Drawing Sheets

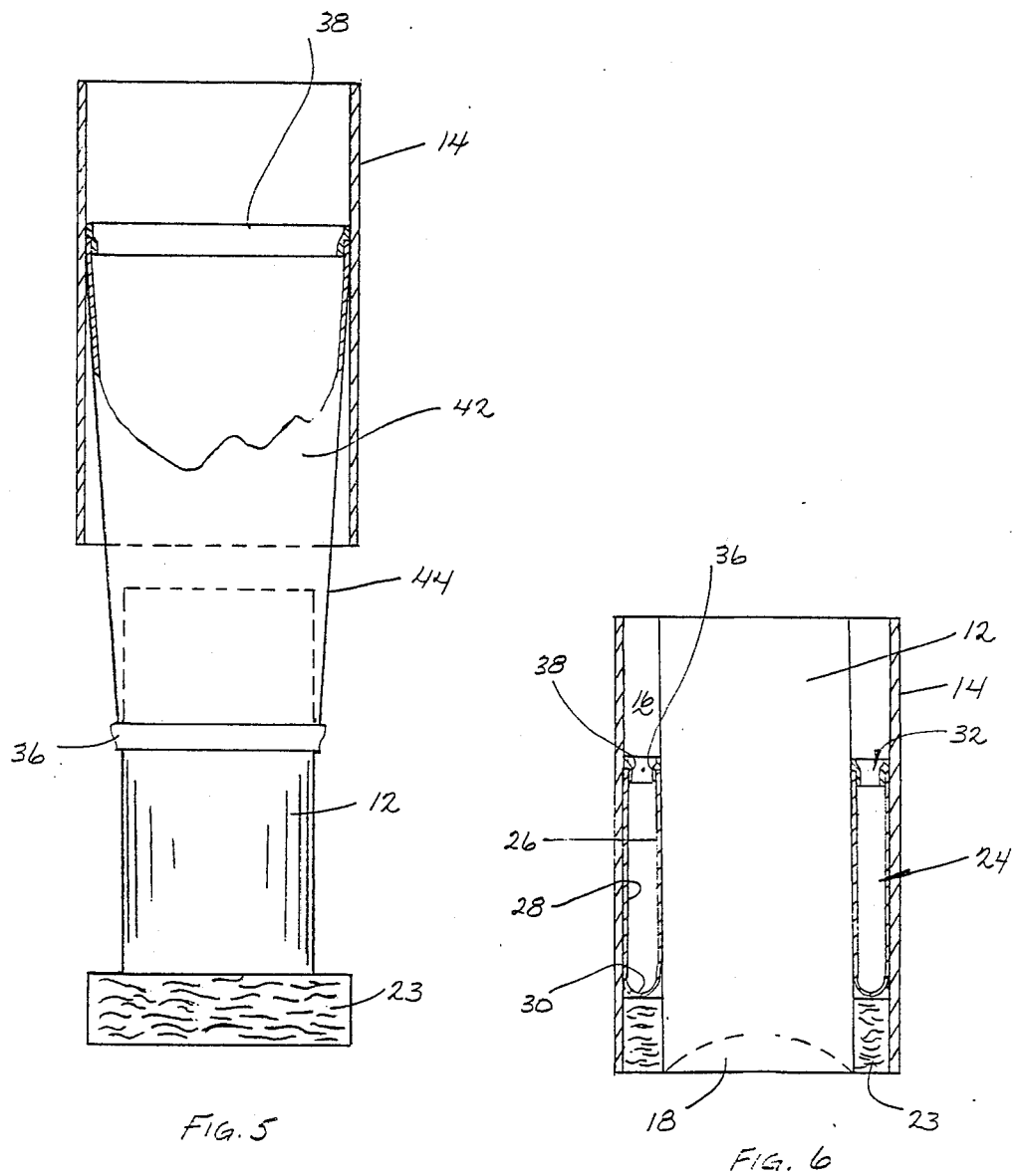

WATER HEATER CONSTRUCTION AND METHOD OF MAKING SAME

BACKGROUND OF THE INVENTION

The present invention relates to water heater devices and more particularly to a insulated water heater device construction, and a method of manufacturing a insulated water heater device.

Typically, water heaters are formed of an inner water tank with an outer shell located over the inner tank with an annular space therebetween. The space between the inner tank and outer shell is filled with a thermal insulation. For many years fiber glass has been used as the insulation material between the inner tank and outer shell. More recently, a foam such as urethane, has been used as the thermal insulation material in place of fiber glass between the inner tank and outer shell. Typically, the foamable material is injected into the space between the inner tank and outer shell, and is allowed to foam in situ. However, there is a problem in restraining the expanding foam within the annual space.

Various proposals have been made to solve this problem.

U.S. Pat. No. 4,372,028 issued on Feb. 8, 1983 to Keith R. Clark et al shows a water heater having a foam filled closed collar located in the annular space at the bottom of the inner tank, and the annular space above the collar filled with expanded foam. The collar functions as a stop to the expanded foam in the annular space thereabove. This patent further shows a method of manufacturing the water heater which includes the steps of forming a flexible, expandable closed elongated bag having a hole therein through which an expandable foam can be injected into the bag. The bag is filled with a foam material which expands the bag to form a collar, and before the foam material has had sufficient time to fully expand, the bag opening is sealed and the bag is circumferentially wrapped around the lower end of the tank with the bag ends overlapping each other. Next, before the foam material in the collar has had sufficient time to expand, the outer shell is positioned over the inner tank and bag. The foam in the bag expands forming a collar which is in compression between the inner tank and outer shell. The annular space above the collar is then filled with expandable foam material.

U.S. Pat. No. 4,447,377 issued on May 8, 1977 shows a water heater wherein a plastic envelope is wrapped around the inner tank. The envelope is in the form of an elongated thin tube having an inner wall, an outer wall, a bottom wall, two end walls and an open top. When wrapped around the inner tank, the end walls of the envelope abut each other. The outer shell is positioned over the inner tank such that the envelope is in the annular space therebetween. Expandable foam is injected through the open envelope top into the envelope and allowed to allowed to expand therein.

SUMMARY OF THE INVENTION

The present invention provides a water heater construction and method of manufacturing the same which provides for easy assembly.

More particularly, the present invention provides a water heater construction comprising an inner water tank, an outer shell concentrically located over the inner water tank defining an annular space therebetween, an open-topped annular pocket located in the annular space has an inner annular pocket wall circumferentially overlaying at least a portion of the length of the exterior wall surface of the water tank, an outer annular pocket wall circumferentially overlaying a portion of the length of the interior wall surface of the outer shell, and an annular bottom end wall across the annular space between the inner tank and outer shell. The annular pocket is filled with a thermal insulating material.

The present invention also provides a method for making a water heater of the type having an inner tank and an outer shell spaced from and encompassing the inner tank defining an annular space therebetween, comprising the steps of locating one end of cylindrical sleeve of flexible material over the interior surface of the outer shell, affixing the one end of the cylindrical sleeve to the interior wall surface of the outer shell at a predetermined location along the length of the outer shell, locating the other end of the cylindrical sleeve of flexible material over the exterior surface of the inner tank, affixing the other end of the cylindrical sleeve to the exterior wall surface of the inner water tank at a predetermined location along the length of the inner tank, and positioning the outer shell concentrically over the inner tank whereupon a first portion of the length of the cylinder sleeve turns inside out to circumferentially overlay at least a portion of the length of the exterior wall surface of the inner tank, a second portion of the length of the cylindrical sleeve overlays at least a portion of the length of the interior wall surface of the outer shell across the annular space from the first portion of the cylindrical sleeve, and an intermediate portion folds back over to form a bottom annular wall across and closing the annular space between the inner tank and outer shell.

BRIEF DESCRIPTION OF THE DRAWING

A better understanding of the present invention will be had upon reference to the following description in conjunction with the accompanying drawings in which like numerals refer to like parts throughout the several views and wherein:

FIG. 5 is a schematic side view, partially in cross-section, of the components of the water heater device of FIG. 1 illustrating a further step of the present invention; and, FIG. 6 is a schematic side view, partially in cross-section, of the components of the water heater device of FIG. 1 illustrating yet another step of the method of the present invention.

DETAILED DESCRIPTION OF THE PREFERRED EMBODIMENT

Figure 1:
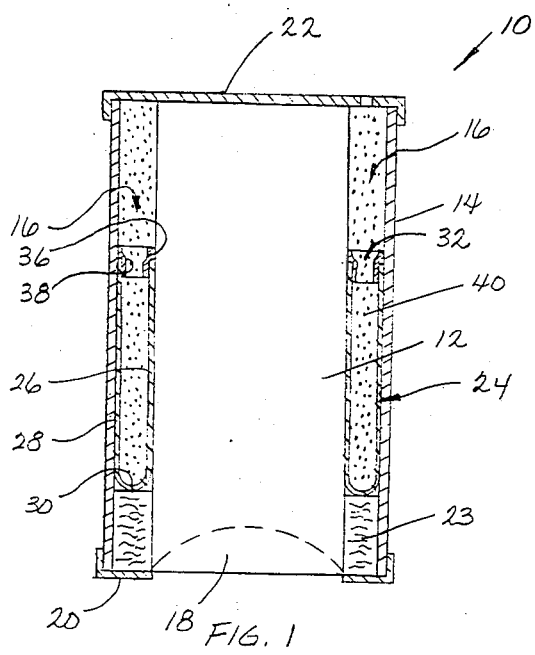
FIG. 1 is a schematic representation, in side view cross-section, of a water heater device embodying the present invention.

FIG. 1 schematically illustrates a conventional type water heater device, generally denoted as the numeral 10, having an inner water tank 12 for containing water and an outer shell 14 concentrically surrounding the inner concentric water tank 12. The outer shell 14 and inner concentric water tank 12 cooperate to define an annular space 16 therebetween. The annular space 16 is filled with a thermal insulation material to lessen heat loss from the water contained in the inner water tank 12. As shown, the water heater device 10 is of the gas fired type having a combustion chamber 18 located at the bottom end of the inner water tank 12. A combustion device or gas burner (not shown) is located within the combustion chamber 18. The bottom of the annular space 16 can be closed by a bottom wall 20, and the top of the water heater device 10 is closed by a cover 22.

Insulation material 23 is located in the annular space 16 coextensive with the height of and surrounding the combustion chamber 18 at the bottom region of the annular space 16. The insulation material 23 is of a non-flammable type, such as a fiberglass batting.

The water heater device 10 further includes an annular pocket 24 located in the annular space 16 continuously about the circumference of the annular space 16 above the fiberglass insulation material batting 23. The annular pocket 24 can be fabricated of a flexible plastic material such as a thermoplastic material, for example, polyethylene film or polypropylene film. The annular pocket 24 has an inner annular wall 26, a concentric outer annular wall 28, and an annular bottom end wall 30 interconnecting the inner annular wall 26 and outer annular wall 28. The annular top end 32 of the annular pocket is open. The inner annular pocket wall 26 circumferentially overlays at least a portion of the length of the exterior wall surface of the water tank 12 above the thermal insulation batt 23, the outer annular pocket wall 28 circumferentially overlays at least a portion of the length of the interior wall surface of the outer shell 14 above the thermal insulation batt 23, and the annular pocket bottom end wall 30 overlays the top end of the annular thermal insulation batt 23. As shown, the inner pocket wall 26 is attached to the exterior wall surface of the inner water tank 23. Preferably, the inner pocket wall 26 is attached to the exterior wall surface of inner water tank 12 about the entire circumference of the inner water tank 12. This can be accomplished by, for example, using a strip of tape 36 located at the top edge of the inner pocket wall 26 proximate the open top end 32 of the pocket 24. The outer pocket wall 28 is attached to the interior wall surface of the outer shell 14. Preferably, the outer pocket wall 28 is attached to the interior wall surface of the outer shell 14 about the entire circumference of the outer shell 14. This can be accomplished by, for example, using a strip of tape 38 located at the top edge of the outer pocket wall 28 proximate the open top end 32 of the pocket 24.

The annular pocket 24 is filled with a thermal insulational material 40 such as, loose fiber material, loose fiber material with a binder, or a foamable material for example urethane, polyethylene polystyrene, and the like, which functions as a thermal insulation surrounding the inner water tank 12.

It should be clearly understood, that the present invention can be successfully used to insulate electrically heated hot water heater devices as well. The primary difference between gas heated or fired hot water heater devices and electrically heated hot water heater devices is that electrically heated hot water devices do not have a combustion chamber 18. Therefore, in electrically heated hot water devices, it is not necessary to have a fiberglass batt 23 because of the diminished fire hazard due to the elimination of burning gas. Therefore, the annular sleeve 24 can extend to the annular bottom wall 20 of the water heater device 10 such that the entire height of the annular space 16 is filled with insulation material 40.

Figure 3:
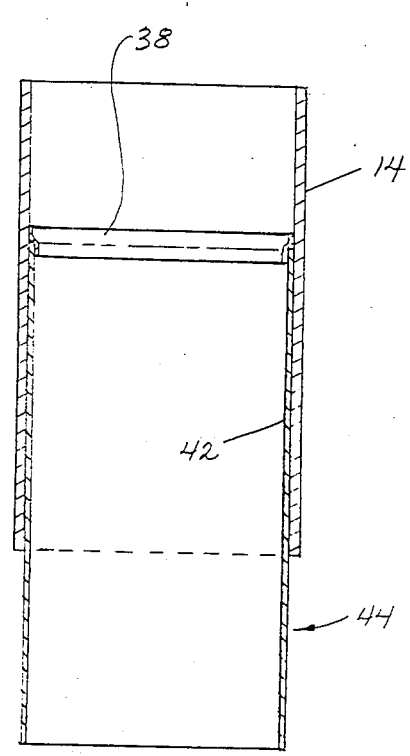
FIG. 3 is a schematic side view in cross-section of one component of the water heater device of FIG. 1, illustrating a step of the method of the present invention.
Figure 2:
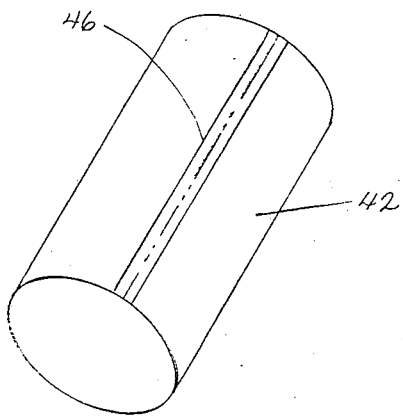
FIG. 2 is a perspective view of one component of the present invention.
Figure 4:
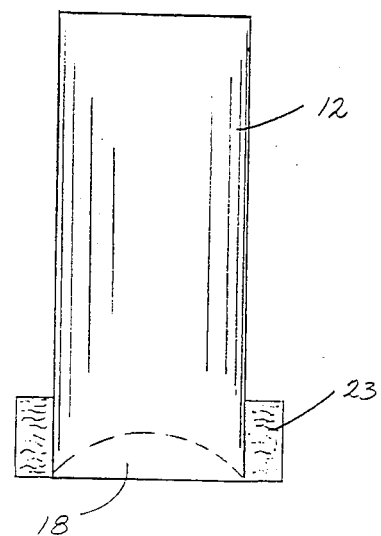
FIG. 4 is a schematic side view, partially in cross-section of another component of the water heater device of FIG. 1 illustrating another step of the method of the present invention.

Now, with reference to FIGS. 2 through 6, the method of making the water heater device 10 will be explained. Referring to FIG. 3, one end of a cylindrical sleeve 42 of flexible plastic material is coaxially located within the outer shell 14 with the top edge of the cylindrical sleeve 42 at a predetermined location along the length of the outer shell 14 and a portion of the length of the cylindrical sleeve 42 projecting outwardly beyond the bottom end of the outer shell 14 such that the projecting end of the cylindrical sleeve 42 forms a skirt portion 44. The top edge of the cylindrical sleeve 42 is attached to the interior wall surface of the outer shell 14 by, for example, the strip of tape 38 circumferentially affixing the cylindrical sleeve 42 to the outer shell 14 proximate the top edge of the cylindrical sleeve 42. As shown in FIG. 2, the cylindrical sleeve 42 can be formed by folding a sheet of material into a cylindrical form and using a length of tape 46 to fasten the elongitudinal edges of the sheet together. Alternatively, the sleeve 42 can be initially fabricated in cylindrical form with a continuous side wall such as by an extrusion process. With reference to FIG. 4, the fiberglass batt 23 is placed circumferentially of the inner water tank 12 at the lower end of the water tank surrounding the combustion chamber 18. As can be best seen in FIG. 5, the outer shell 14 is located coaxially above the inner water tank 12 and the skirt portion 44 of the cylindrical sleeve 42 is concentrically fitted over and circumferentially of the inner water tank 12 with the bottom edge of the cylindrical sleeve 42 at a predetermined location along the length of the inner water tank 12. The bottom edge of the cylindrical sleeve 42 is attached to the exterior wall surface of the inner water tank 23 by, for example, the strip of tape 36 circumferentially affixing the cylindrical sleeve 42 to the inner water tank 12 proximate the bottom edge of the cylindrical sleeve 42. The outer shell 14 is positioned concentrically of the inner water tank 12 by moving the outer shell 14 in a direction of the longitudinal axes of the outer shell 14 and inner water tank 12 until the outer shell 14 concentrically receives the inner water tank 12 as can be best seen in FIG. 6. As the outer shell 14 is moved concentrically over the inner water tank 12 a first portion 26 of the length of he cylindrical sleeve 42 turns inside out to circumferentially overlay a portion of the length of the exterior wall surface of the inner water tank 12 forming the inner pocket wall 26 of the annular pocket 24, a second portion 28 of the length of the cylindrical sleeve 42 circumferentially overlays a portion of the interior wall surface of the outer shell 14 across the annular space 16 from the first portion 26 forming the outer pocket wall 28, and an intermediate third portion 30 of the cylindrical sleeve 42 folds back over to form the annular bottom end wall 30 of the annular pocket 24 across the annular space 16, thusly forming the annular pocket 24. An insulation material 40 such as loose fiber material, loose fiber material with a binder, for example fiberglass and the like, or a foamable material, for example, urethane, polyethylene, polystyrene and the like, is then installed into the annular pocket 24 in the annular space 16. The cover 22 is positioned over the top end of the water heater device 10. when an expandable foamable material is used, it is injected into the pocket 24 and the expandable foam material 40 is allowed to foam in situ. Of course, the cover 22 can be positioned over the water heater device 10, and the expandable foam material 40 injected into the annular pocket 24 in the annular space 16 through an appropriate hole in the cover 22. As the foam material 40 expands, it exerts radial forces which force the inner pocket wall 26 tightly against the exterior wall surface of the inner tank 12 and the outer pocket wall 28 against the interior wall surface of the outer shell 14 tightly sealing the interface of the pocket wall 26 and water tank 12 and the interface of the pocket wall 28 and outer shell 14 preventing the leakage of foaming material, therebetween.

It is contemplated that the sequence of fitting the cylindrical sleeve 42 to the outer shell 14 and inner tank 12, as discussed above, could be reversed, that is the cylindrical sleeve 42 could be first circumferentially installed over the inner water tank 12 and then circumferentially installed in the outer shell 14. However, it presently appears that it is easier to first install the cylindrical sleeve 42 in the outer shell 14 and then install it over the inner water tank 12.

It should be also clearly understood that the above discussed procedure is identical when forming the annular pocket pocket 24 in an electrically heated water heater device. The only difference being that no fiberglass batt 23 need be used.

The foregoing detailed description is given primarily for clearness of understanding and no unnecessary limitations are to be understood therefrom for modifications will become obvious to those skilled in the art upon reading this disclosure and may be made without departing from the spirit of the invention and scope of the appended claims.

I claim:

1. A water heater device comprising:
a water tank;
an outer shell concentriclaly located over the water tank defining an annular space therebetween;
an annular pocket having an annular open top within the annular space, the annular pocket comprising an inner annular pocket wall circumferentially overlaying at least a portion of the length of the exterior wall surface of the water tank, an outer annular pocket wall circumferentially overlaying at least a portion of the length of the interior wall surface of the outer shell, and an annular bottom end wall across the space between the water tank and outer shell; and,
an insulation material filling the annular pocket.

2. The water heater device of claim 1, further comprising:
means for attaching the inner annular pocket wall to the exterior wall surface of the water tank; and,
means for attaching the outer annular pocket wall to the interior wall surface of the outer shell.

3. The water heater device of claim 2, wherein:
the attaching means attaches the inner annular pocket wall to the exterior wall surface of the water tank proximate the top edge of the inner annular pocket wall; and,
the attaching means attaches the outer annular pocket wall to the interior wall surface of the outer shell proximate the top edge of the outer annular pocket wall.

4. The water heater device of claim 2, wherein:
the attaching means attaches the inner annular pocket wall to the exterior surface of the water tank circumferentially of the water tank; and,
the attaching means attaches the outer annular pocket wall to the interior surface of the outer shell circumferentially of the outer shell.

5. The water heater device of claim 1, wherein the insulation material also fills any of the annular space above the pockets.

6. The water heater device of claim 1, wherein the insulation material in the annular pocket is a fiber material.

7. The water heater device of claim 1, wherein the insulation material in the annular pocket is a foamed material.

8. The water heater device of claim 1, further comprising an insulation material batt located in the annular space beneath the annular bottom end wall of the annular pocket.

9. The water heater device of claim 8, wherein the annular bottom end wall of the annular pocket overlays the top end of the insulation material batt.

10. The water heater device of claim 1, wherein:
the top edge of the inner annular pocket wall is located below the top end of the water tank; and,
the top edge of the outer annular pocket wall is located below the top end of the outer shell.

11. The water heater device of claim 1, wherein:
the top edge of the inner annular pocket wall is located at the top end of the water tank; and
the top edge of the outer annular pocket wall is located at the top end of the outer shell.

12. The water heater device of claim 1, wherein:
the top edge of the inner annular pocket wall is located at the top end of the water tank; and
the top edge of the outer annular pocket wall is located below the top end of the outer shell.

13. The water heater construction of claim 1, wherein:
the top edge of the inner annular pocket wall is located below the top end of the water tank; and,
the top edge of the outer annular pocket wall is located at the top end of the outer shell.

14. The water heater of claim 1, wherein the annular pocket is fabricated of a flexiable material.

* * * * *